United States Patent
Braun et al.

(10) Patent No.: US 7,447,805 B2
(45) Date of Patent: Nov. 4, 2008

(54) BUFFER CHIP AND METHOD FOR CONTROLLING ONE OR MORE MEMORY ARRANGEMENTS

(75) Inventors: Georg Braun, Holzkirchen (DE); Hermann Ruckerbauer, Moos (DE)

(73) Assignee: Infineon Technologies AG, Munich (DE)

( * ) Notice: Subject to any disclaimer, the term of this patent is extended or adjusted under 35 U.S.C. 154(b) by 452 days.

(21) Appl. No.: 10/792,408

(22) Filed: Mar. 3, 2004

(65) Prior Publication Data
US 2004/0228166 A1 Nov. 18, 2004

(30) Foreign Application Priority Data
Mar. 7, 2003 (DE) ................................ 103 09 919

(51) Int. Cl.
G06F 13/00 (2006.01)
G06F 13/38 (2006.01)
G06F 3/00 (2006.01)
G06F 5/00 (2006.01)
G06F 12/00 (2006.01)

(52) U.S. Cl. .................... 710/5; 710/1; 710/20; 710/36; 710/40; 710/52; 710/54; 710/58; 710/59; 710/62; 710/63; 710/64; 710/71; 710/72; 710/73; 710/74; 711/100; 711/150; 711/151; 711/154; 711/167; 711/168; 711/169

(58) Field of Classification Search ............ 710/1, 710/5–7, 20, 31, 36, 40, 52, 54, 58, 59, 62–66, 710/71–74; 711/100, 150–152, 154, 158, 711/167–169

See application file for complete search history.

(56) References Cited

U.S. PATENT DOCUMENTS

| 4,792,926 | A  | * | 12/1988 | Roberts ................. 365/189.02 |
|-----------|----|---|---------|--------------------------------------|
| 5,745,791 | A  | * | 4/1998  | Peek et al. .................... 710/52 |
| 5,787,481 | A  |   | 7/1998  | Boutaud et al.                       |
| 6,144,616 | A  | * | 11/2000 | Suzuki et al. ............... 365/233 |
| 6,343,352 | B1 | * | 1/2002  | Davis et al. ................. 711/158 |
| 6,430,649 | B1 | * | 8/2002  | Chaudhry et al. ........... 711/100  |
| 6,530,006 | B1 | * | 3/2003  | Dodd et al. ................. 711/167 |
| 6,622,224 | B1 | * | 9/2003  | Cloud ....................... 711/158 |
| 6,622,227 | B2 | * | 9/2003  | Zumkehr et al. ............ 711/167  |
| 6,640,292 | B1 | * | 10/2003 | Barth et al. ................. 711/168 |

(Continued)

FOREIGN PATENT DOCUMENTS

DE 10210904 1/2003

*Primary Examiner*—Tanh Q Nguyen
(74) *Attorney, Agent, or Firm*—Patterson & Sheridan, L.L.P.

(57) ABSTRACT

A buffer chip having a first data interface for receiving a data item which is to be written and for sending a data item which has been read, having a conversion unit for parallelizing the received data item and for serializing the data item which is to be sent, having a second data interface for writing the parallelized data item to a memory arrangement via a memory data bus and for receiving the data item read from the memory arrangement via the memory data bus; having a write buffer storage for buffer-storing the data item which is to be written, having a control unit in order, after reception of a data item which is to be written via the first data interface in line with a write command, to interrupt the data from being written from the write buffer storage via the second data interface upon a subsequent read command.

20 Claims, 4 Drawing Sheets

U.S. PATENT DOCUMENTS 6,877,077 B2 * 4/2005 McGee et al. .............. 711/158
6,877,079 B2   4/2005 Yoo et al.

2001/0052057 A1   12/2001 Lai et al.

* cited by examiner

FIG. 3

|  | | CA Request Tick | | | |
|---|---|---|---|---|---|
|  | | 0 | 1 | 2 | 3 |
| CA Lines | CA[0] | R[0] | HUB | A[0] | A[8] |
| | CA[1] | R[1] | RAS | A[1] | A[9] |
| | CA[2] | R[2] | CAS | A[2] | A[10] |
| | CA[3] | R[3] | WE | A[3] | A[11] |
| | CA[4] | RID[0] | B[0] | A[4] | A[12] |
| | CA[5] | RID[1] | B[1] | A[5] | A[13] |
| | CA[6] | RID[2] | B[2] | A[6] | A[14] |
| | CA[7] | RID[3] | B[3] | A[7] | A[15] |

|  | | CA Request Tick | | | |
|---|---|---|---|---|---|
|  | | 0 | 1 | 2 | 3 |
| CA Lines | CA[0] | R[0] | HUB | A[0] | A[8] |
| | CA[1] | R[1] | RAS | A[1] | A[9] |
| | CA[2] | R[2] | CAS | A[2] | A[10] |
| | CA[3] | R[3] | WE | A[3] | A[11] |
| | CA[4] | R[4] | B[0] | A[4] | A[12] |
| | CA[5] | R[5] | B[1] | A[5] | A[13] |
| | CA[6] | R[6] | B[2] | A[6] | A[14] |
| | CA[7] | R[7] | B[3] | A[7] | A[15] |
| | CA[8] | RID[0] | RID[1] | RID[2] | RID[3] |

| | DQTick | | | |
|---|---|---|---|---|
| | 0 | 1 | 2 | 3 |
| DQ[0] | RID[0] | DQ[12] | DQ[28] | DQ[44] |
| DQ[1] | RID[1] | DQ[13] | DQ[29] | DQ[45] |
| DQ[2] | RID[2] | DQ[14] | DQ[30] | DQ[46] |
| DQ[3] | RID[3] | DQ[15] | DQ[31] | DQ[47] |
| DQ[4] | DQ[0] | DQ[16] | DQ[32] | DQ[48] |
| DQ[5] | DQ[1] | DQ[17] | DQ[33] | DQ[49] |
| DQ[6] | DQ[2] | DQ[18] | DQ[34] | DQ[50] |
| DQ[7] | DQ[3] | DQ[19] | DQ[35] | DQ[51] |
| DQ[8] | DQ[4] | DQ[20] | DQ[36] | DQ[52] |
| DQ[9] | DQ[5] | DQ[21] | DQ[37] | DQ[53] |
| DQ[10] | DQ[6] | DQ[22] | DQ[38] | DQ[54] |
| DQ[11] | DQ[7] | DQ[23] | DQ[39] | DQ[55] |
| DQ[12] | DQ[8] | DQ[24] | DQ[40] | DQ[56] |
| DQ[13] | DQ[9] | DQ[25] | DQ[41] | DQ[57] |
| DQ[14] | DQ[10] | DQ[26] | DQ[42] | DQ[58] |
| DQ[15] | DQ[11] | DQ[27] | DQ[43] | DQ[59] |

| | DQTick | | | |
|---|---|---|---|---|
| | 0 | 1 | 2 | 3 |
| DQ[0] | DQ[0] | DQ[16] | DQ[32] | DQ[48] |
| DQ[1] | DQ[1] | DQ[17] | DQ[33] | DQ[49] |
| DQ[2] | DQ[2] | DQ[18] | DQ[34] | DQ[50] |
| DQ[3] | DQ[3] | DQ[19] | DQ[35] | DQ[51] |
| DQ[4] | DQ[4] | DQ[20] | DQ[36] | DQ[52] |
| DQ[5] | DQ[5] | DQ[21] | DQ[37] | DQ[53] |
| DQ[6] | DQ[6] | DQ[22] | DQ[38] | DQ[54] |
| DQ[7] | DQ[7] | DQ[23] | DQ[39] | DQ[55] |
| DQ[8] | DQ[8] | DQ[24] | DQ[40] | DQ[56] |
| DQ[9] | DQ[9] | DQ[25] | DQ[41] | DQ[57] |
| DQ[10] | DQ[10] | DQ[26] | DQ[42] | DQ[58] |
| DQ[11] | DQ[11] | DQ[27] | DQ[43] | DQ[59] |
| DQ[12] | DQ[12] | DQ[28] | DQ[44] | DQ[60] |
| DQ[13] | DQ[13] | DQ[29] | DQ[45] | DQ[61] |
| DQ[14] | DQ[14] | DQ[30] | DQ[46] | DQ[62] |
| DQ[15] | DQ[15] | DQ[31] | DQ[47] | DQ[63] |
| DQ[16] | RID[0] | RID[1] | RID[2] | RID[3] |

600

BUFFER CHIP AND METHOD FOR CONTROLLING ONE OR MORE MEMORY ARRANGEMENTS

CROSS-REFERENCE TO RELATED APPLICATIONS

This application claims foreign priority benefits under 35 U.S.C. §119 to co-pending German patent application number 103 09 919.0-53, filed Mar. 7, 2003. This related patent application is herein incorporated by reference in its entirety.

BACKGROUND OF THE INVENTION

1. Field of the Invention

The invention relates to a buffer chip for actuating one or more connected memory arrangements. The invention also relates to a method for operating a buffer chip for fast memory architectures, such as DDR-III memory chips.

2. Description of the Related Art

For very fast and high-density memory architectures, such as those required for DDR-III memory chips, "buffer chips" are used. The buffer chips allow the "stub bus", as used today in DDR and DDR-II memory chips, to be replaced and instead a hierarchic bus system in which there are now just point-to-point (P2P) or point-to-2-point (P22P) connections to be used. Such data links allow data transfer rates far beyond one GBPS. In addition, cascading makes it possible to concatenate a large number of buffer chips with one another and to produce memory systems having a very large number of memory chips on just one memory main bus.

The buffer chips usually have one or more memory arrangements connected to them, with the buffer chip receiving commands and data via the P2P data link, parallelizing said commands and data and forwarding them to the appropriate connected memory arrangement. During reading, data is read from the appropriate addressed memory arrangement, serialized and output to the memory controller via the P2P data link.

Particularly in the case of DRAM memory chips, changes from a write operation to a read operation and changes from a read operation to a write operation require different lengths of time, particularly when reading or writing requires that the same memory arrangement be addressed. While changing over from a write operation to a read operation for a memory arrangement necessitates that a waiting time based on the chip parameters TWR (Write Recovery) or TWTR (Write to Read) be taken into account, it is possible to change from a write operation in one memory arrangement to a read operation in another memory arrangement essentially without any waiting time. The result of this is either that the memory controller always uses the long bus turnaround time for every change of access in order to avoid providing additional circuit, for reasons of complexity, or that the memory controller contains a complex logic circuit to provide optimum actuation for all the memory arrangements in the overall system.

The cause of the long bus turnaround times in a memory arrangement is not based on the architecture of the data bus in the system, but rather is linked to the design of the memory chips. This is because it is necessary to ensure that the write data are written safely to the cell array before the activated word line is closed again (TWR) or before new read data can be read from the cell array (TWTR).

SUMMARY OF THE INVENTION

It is therefore an object of the present invention to provide a buffer chip for actuating one or more memory arrangements which takes into account the problem of the different bus turnaround times, particularly the problem of changing from a write operation to a read operation in a memory arrangement, so that the memory controller which is connected to the buffer chips can be of the simplest design possible. It is also an object of the present invention to provide a method for operating a buffer chip.

According to a first aspect of the present invention, a buffer chip is provided for actuating one or more memory arrangements. The buffer chip includes a first data interface for receiving a data item which is to be written and for sending a data item which has been read. A conversion unit parallelizes the received data item and serializes the data item which is to be sent. A second data interface writes the parallelized data item to the memory arrangement via a memory data bus and receives the data item which has been read from the memory arrangement via the memory data bus. A write buffer storage buffer-stores the data item which is to be written. After reception of a data item which is to be written via the first data interface in line with a write command, a control unit stops the data from being written from the buffer storage via the second data interface upon a subsequent read command for the same memory arrangement, in order to read the requested data into the buffer chip via the second data interface.

In this way, the problem of the long bus turnaround times when changing over from a write operation to a read operation can be solved by virtue of the last data item which is to be written in a write sequence being left in the buffer storage at first, and a read command being executed as soon as the read command is received by the buffer chip. This saves time, since it is not first necessary to wait for writing of the last data item which is to be written before starting to read.

Provision may be made for the control unit to write the data item stored in the write buffer storage to the memory arrangement when a write command again states that data are to be written to the memory arrangement and/or when the reading of data from the memory arrangement in question has ended. In this way, it is possible for the data which are to be read in line with the read command to be able to be output to the memory controller via the buffer chip as quickly as possible and for the data stored in the write buffer storage for the purpose of writing to be written to the memory arrangement only when the reading of data to the memory arrangement in question has ended or is briefly interrupted. If the buffer chip receives a write command again after the read command, then the write buffer storage first needs to be emptied by writing the data items stored therein to the memory arrangement before further data to be written can be received by the buffer chip.

Provision may be made for the control unit to output the data item via the first data interface in the event of a read command if the read command states that the data item stored in the write buffer storage is to be read. This allows the reading of a stored data item to be speeded up when the data item to be read is still in the buffer storage.

The write buffer storage may have a size for storing a plurality of data items, which means that it is possible to avoid any overflow of the write buffer storage when changing from writing a data item in line with a write command to reading a data item via the first data interface in line with a read command and subsequently writing a data item again via the first data interface.

The buffer chip can have a read buffer storage for buffer-storing a data item which is to be read. The control unit is then designed to send just a portion of the data item which is to be read via the first data interface in line with a read command.

Particularly in server systems, two or more memory buses are often addressed in parallel in order to increase the data transfer rate and the maximum possible memory depth. This design may be confronted by the difficulty that too large a volume of data is provided by the memory buses addressed in parallel. The cause of this is a data bus design which is usually used within memory chips, particularly within DDR memory chips. To be able to increase the data transfer rate on the interface continuously, a plurality of data bits are read in parallel from the cell array, whose access speed cannot normally be increased to the same extent as the external data transfer rate, on a broad internal bus and are combined with a very fast data stream on a single line using a multiplexer just upstream of the actual output driver. This design is called a prefetch design. In DDR memory chips, the prefetch ratio is 2, for example. That is to say that two respective bits can be transferred from or to the cell array per data connection of the memory chip. In DDR-II memory chips, the prefetch ratio is 4, and in DDR-III memory chips, the prefetch ratio may be 8. The minimum burst length when accessing such a memory chip is usually increased in line with the prefetch ratio. Thus, the minimum burst length is 2 bits in DDR memory chips and is 4 bits in DDR-II memory chips. If a prefetch ratio of 8 is chosen for DDR-III memory chips, then the minimum burst length in DDR-III memory chips will be 8 bits.

For a read command, the volume of data which can be transferred to a CPU is 64 bytes. If two 8-byte buses are now operated in parallel or in interleaved fashion, then the volume of data which are transferred for a minimum burst length of 8 is 128 bytes. For this reason, a minimum burst length of 4 bits is desirable, but this conflicts with the prefetch ratio of 8 in DDR-III memory chips.

For this reason, the control unit can be provided such that although the buffer chip receives the data from the memory arrangement in line with the minimum burst length, it sends only a portion of the data which are to be read to the memory controller via the first interface. The remaining data may remain stored in the read buffer storage.

The read buffer storage may have a size for storing a plurality of data items, where the control unit preloads data into the read buffer storage in line with the cache function. In this way, the buffer chip can be provided with a full cache function in order to improve data access to the memory arrangements connected to the buffer chip.

In one embodiment, the control unit buffers a plurality of read commands in order to send a data item which is to be read and which is stored in the read buffer storage or in the write buffer storage via the first interface before the data item which is to be read and which is stored in the memory arrangement is sent via the first interface. This opening-up of the sequence of execution of the received read commands allows preferential execution of those read commands whose associated data are already in the read or write buffer storage. This firstly empties the read or write buffer storage more quickly so as to create space for further data which are to be read or to be written and secondly allows latencies when reading data from the addressed memory arrangement to be bridged by the sending of data which are to be read via the first data interface from the read or write buffer storage.

In line with a further aspect of the present invention, a method for operating a buffer chip to which one or more memory arrangements are connected is provided. In line with a write command, a data item which is to be written is received by the buffer chip and a data item which has been read in line with a read command is sent from the buffer chip. First, a data item which is to be written is received in line with a first write command, the received data item is parallelized and it is first buffer-stored in the buffer chip. The received data item is written to the memory arrangement if the first write command is followed by a second write command. If the first write command is followed by a first read command, however, the buffer-stored data item which is to be written is not written to the memory arrangement at first, but rather the data item which is to be read is first read from the memory arrangement.

This allows the bus turnaround time from a write operation to a read operation to be hidden by first buffer-storing the last data item which is to be written prior to a read operation for the same memory arrangement.

In one embodiment, the buffer-stored data item is written to the memory arrangement if the first read command is followed by a third write command, or if the buffer chip is not accessed with a write command or a read command. In this way, a pause during the access to the memory arrangement is awaited in order to write the data item which is to be written in the write buffer storage to the memory arrangement in question. It is also necessary to write to the memory arrangement if a further write command follows, in order to create space for buffer-storing the data item which is to be written in line with the third write command.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 shows a command protocol for actuating a buffer chip according to one embodiment of the invention.

FIG. 4 shows another command protocol for a buffer chip according to another embodiment of the invention.

FIG. 5 shows a data protocol for a buffer chip according to one embodiment of the invention.

FIG. 6 shows another data protocol for a buffer chip according to another embodiment of the invention.

DETAILED DESCRIPTION OF THE PREFERRED EMBODIMENT

Figure 1:
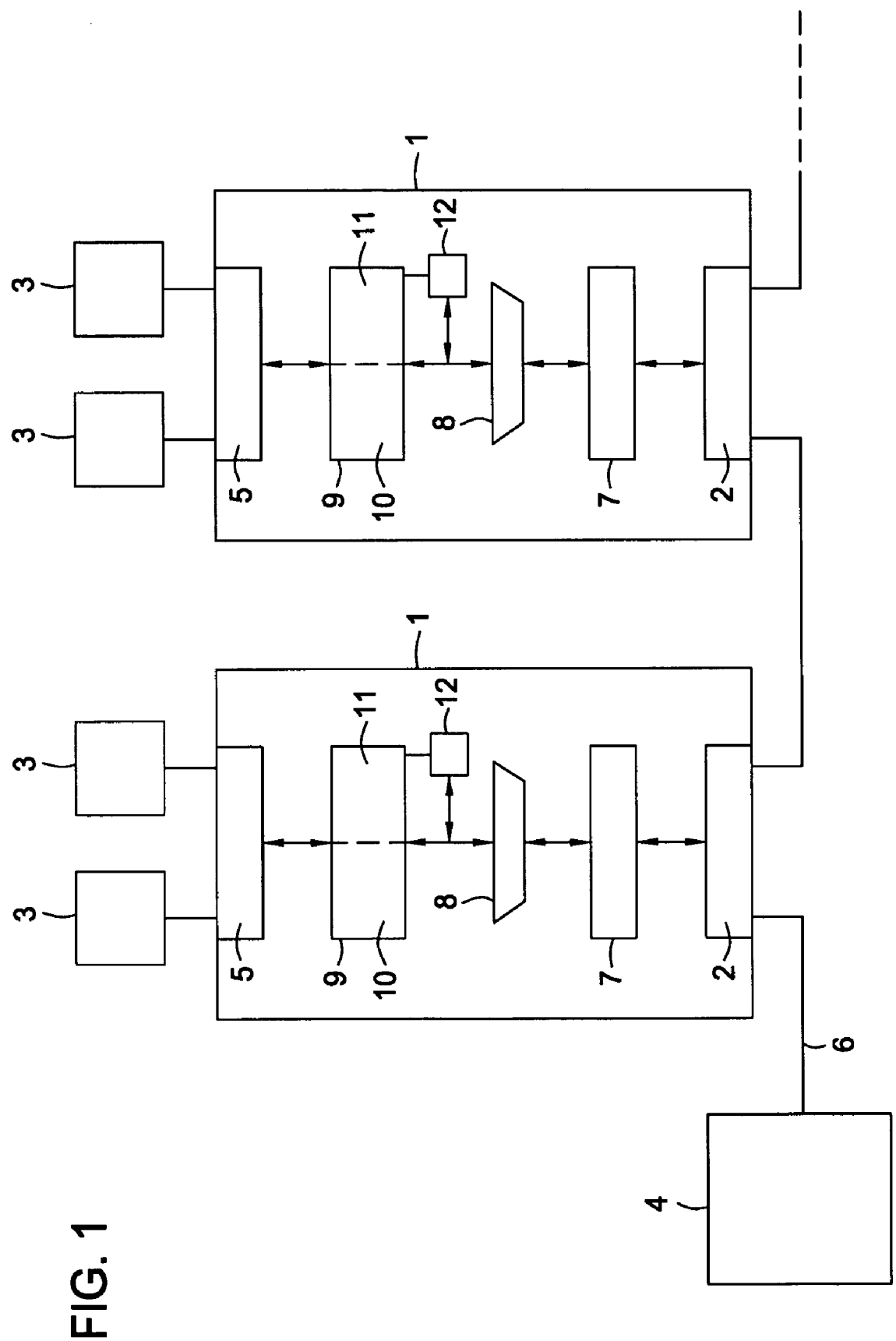
FIG. 1 shows a block diagram of a buffer chip according to one embodiment of the invention.

FIG. 1 shows a buffer chip 1 according to one embodiment of the invention. The buffer chip 1 has a first data interface 2 for receiving command data and for transferring data which have been read from one of the memory arrangements 3 to a memory controller 4 or to further buffer chips. The first data interface 2 is able to receive data which are to be written and is able to write these data to the respectively addressed memory arrangement 3. Reading from the memory arrangements 3 or writing to the memory arrangements 3 is performed via a second data interface 5.

The memory arrangements 3 may be connected to the second data interface 5 by means of separate data lines. Alternatively, the memory arrangements 3 may be connected to the buffer chip 1 by means of a common data bus via the second data interface 5.

The buffer chips 1 may be connected to the memory controller 4 in the form of a daisychain (i.e., merely point-to-point connections between memory controller 4 and the first buffer chip 1 and between the first buffer chip and a second buffer chip). In one embodiment, there is no common data bus via which all of the data are transferred between buffer chips 1 and memory controller 4.

A data bus 6 having a P2P data link allows faster transfer of data, since the line capacities are lower. The result of the faster transfer of data is that fewer data lines are necessary from the memory controller 4 to the buffer chips 1, which means that it is easier to provide identical data line lengths for the data bus 6 in the layout. Identical data line lengths have the advantage that faster signals can be transferred, since the propagation times on all the data lines are then identical.

The data bus 6 may be used to transfer command data and memory data. The command data may specify the address of the memory arrangement 3, of the memory bank and also of the memory location to which memory data are to be written or from which memory data are to be read. The memory controller 4 may send a command data item, which is received by the first data interface 2 and analyzed in a switching device 7. The switching device 7 decides whether one of the memory arrangements 3 connected to the respective buffer chip 1 needs to be addressed.

If one of the connected memory chips 3 needs to be addressed, the command data and/or the memory data are parallelized in a conversion unit 8, so that the data available have the necessary data width and speed for the memory arrangements 3. If none of the memory arrangements 3 connected to the respective buffer chip 1 need to be addressed, then the switching device 7 forwards the received command data item and/or the received memory data item via the first data interface 2 to a subsequent buffer chip 1. The forwarded command data item and/or memory data item are received by the respective first data interface 2 on the next buffer chip 1 and processed by the switching device 7 respectively.

The conversion unit 8 may be connected to a buffer storage 9 which comprises a write buffer storage 10 and a read buffer storage 11. The write buffer storage 10 is used for initially buffer-storing a memory data item which is to be written before the memory data item is written to the respective addressed memory arrangement 3 via the second data interface 5. The read buffer storage 11 has the function of buffer-storing a memory data item which has been read from the respectively addressed memory arrangement 3 via the second data interface 5, before the memory data item is output to the memory controller 4 via the conversion unit 8 and the first data interface 2. Within the buffer chips 1, data buses may be in either bidirectional or unidirectional form.

The buffer storage 9 is used to buffer a data item to accommodate different bus turnaround times from a write operation to a read operation or from a read operation to a write operation. Particularly when changing from a write operation to a read operation, access to the same memory arrangement 3 requires a high latency before the last writing of a memory data item to the memory arrangement can be followed by reading of a memory data item from the same memory arrangement 3. This latency is prescribed by the parameters of the memory chips (TWR and TWTR) provided in the memory arrangement 3. When changing from a write operation in one of the memory arrangements 3 to a read operation in one of the other memory arrangements 3, however, no significant latency arises, since it is possible to terminate writing of the last data item which is to be written while data are still being read from the other memory arrangement 3.

To minimize the complexity of the memory controller 4, provision is usually made for the latency to be high enough for the maximum required latency not to be undershot during all possible memory access operations, regardless of the type of access. The result of this is that, for many memory access operations, higher latency is provided than would be necessary.

Alternatively, the memory controller 4 may be provided to ascertain the associated latency on the basis of the type of memory access and to send the command data with an appropriate delay. This would noticeably increase the complexity of the circuits in the memory controller 4.

In one embodiment, the buffer storage 9 in the buffer chip 1 allows the memory controller 4 to be provided at a low complexity level, since the buffer storage 9, particularly the write buffer storage 10, is able to hide the latency required for a bus turnaround from a write operation to a read operation for the same memory arrangement 3.

In one embodiment, the buffer storage 9 works as follows. Data are written via the data bus 6 and the buffer chip 1 to the memory arrangement 3 according to a write command and the subsequent one or more memory data items. Before the memory data are written to the memory arrangement addressed by the command data item, the memory data are first stored in the write buffer storage 10. If the data bus 6 is used to send the buffer chip 1 a command data item which contains a read command for reading a data item from the same memory arrangement 3, then the last memory data item to be written in the write buffer storage 10 is not output to the memory arrangement 3 in question via the second data interface 5. Instead, the read command received is immediately forwarded to the addressed memory arrangement 3, and the requested data are read via the read buffer storage 11 via the data bus 6. The control unit 12 decides, on the basis of the received command data, whether the write data item stored in the write buffer storage 10 needs to be written to the addressed memory arrangement 3. As soon as the control unit 12 detects a read command, a check is carried out to determine whether the read command relates to the same memory arrangement 3 as the write operations performed previously. If the read command does relate to the same memory arrangement 3, then the writing of the write data to the memory arrangement 3 is stopped and the read command is immediately forwarded to the memory arrangement 3 in question.

If the read command relates to another memory arrangement 3, then the writing of the write data to the memory arrangement 3 in question can be continued and the read command can be forwarded to the other memory arrangement 3 addressed by the read command in order to start reading the data. However, this is possible only when the memory arrangements 3 are connected to the second data interface 5 by means of separate data lines. If the memory arrangements 3 are connected to the buffer chip by means of a common data bus, then the latter variant does not apply.

On account of the fact that, particularly in DDR (Double Data Rate) memory chips, data are written and read in burst access operations, i.e., in access operations in which a plurality of data packets can be successively written to the memory chip 3 or read from the memory chip 3 without sending a write or read command in advance of every data item, it is possible for the buffer chip 1 to receive a read command while the writing of data during the burst access to the memory arrangement 3 is not yet complete.

The memory data item stored in the write buffer storage is written when access to the memory arrangement 3 in question is interrupted, i.e., the reading of data from the memory arrangement is first ended. In this case, the time in which there is no access to the memory arrangement 3 in question is used in order to empty the write buffer storage 10 by storing the data stored therein in the memory arrangement 3. In addition, the memory data stored in the write buffer storage 10 are written to the memory arrangement 3 when write access to the memory arrangement 3 in question is started again. This serves to empty the write buffer storage 10 as quickly as possible, so that it is possible to buffer-store new write data arriving.

The control unit 12 can also provide for the reading of memory data from the addressed memory arrangement 3 to involve only some of the memory data which have been read and are stored in the read buffer storage 11 being sent to the memory controller 4 via the data bus 6. This is appropriate since, in future memory architectures with burst access to memory chips in the memory arrangement 3, too great a volume of data may be provided which cannot be picked up simultaneously by a microprocessor connected to the memory controller 4.

Particularly in the case of DDR memory chips, the minimum burst length, i.e. the minimum volume of data which are written or read with a command, is dependent on the "prefetch ratio". While the prefetch ratio is 2 in DDR memory chips and the prefetch ratio is 4 in DDR-II memory chips, the prefetch ratio may be 8 for the coming generation of DDR-III memory chips. Particularly in overall systems in which two memory channels are operated in parallel or in interleaved fashion, it is advantageous if the minimum burst length would only be 4 for DDR-III memory chips as well. The reason for this is that the volume of data which are transferred to the microprocessor upon a read command will probably be 64 bytes. If two 8-byte data buses are operated in parallel or in interleaved fashion, then the volume of data which are transferred for a minimum burst length of 8 is 128 bytes. For this reason, it would be desirable to limit the minimum burst length to 4.

To achieve this, the read buffer storage 11 can buffer-store the data from the memory arrangements in line with a burst length of 8 bits, with the control unit 12 respectively forwarding just a portion, namely half, of the buffer-stored memory data to the conversion unit 8 for output to the first data interface 2 and then the memory controller 4. In this way, the memory controller 4 receives only that volume of data which the connected microprocessor requires, even in memory arrangements having memory chips which have a minimum burst length of more than 4 bits.

The data which have been read initially remain in the read buffer storage 11, so that a suitable read command is able to transfer the remaining data directly from the read buffer storage 11 to the memory controller 4 without the buffer chip 1 sending a fresh read command to the memory arrangement 3.

Figure 2:
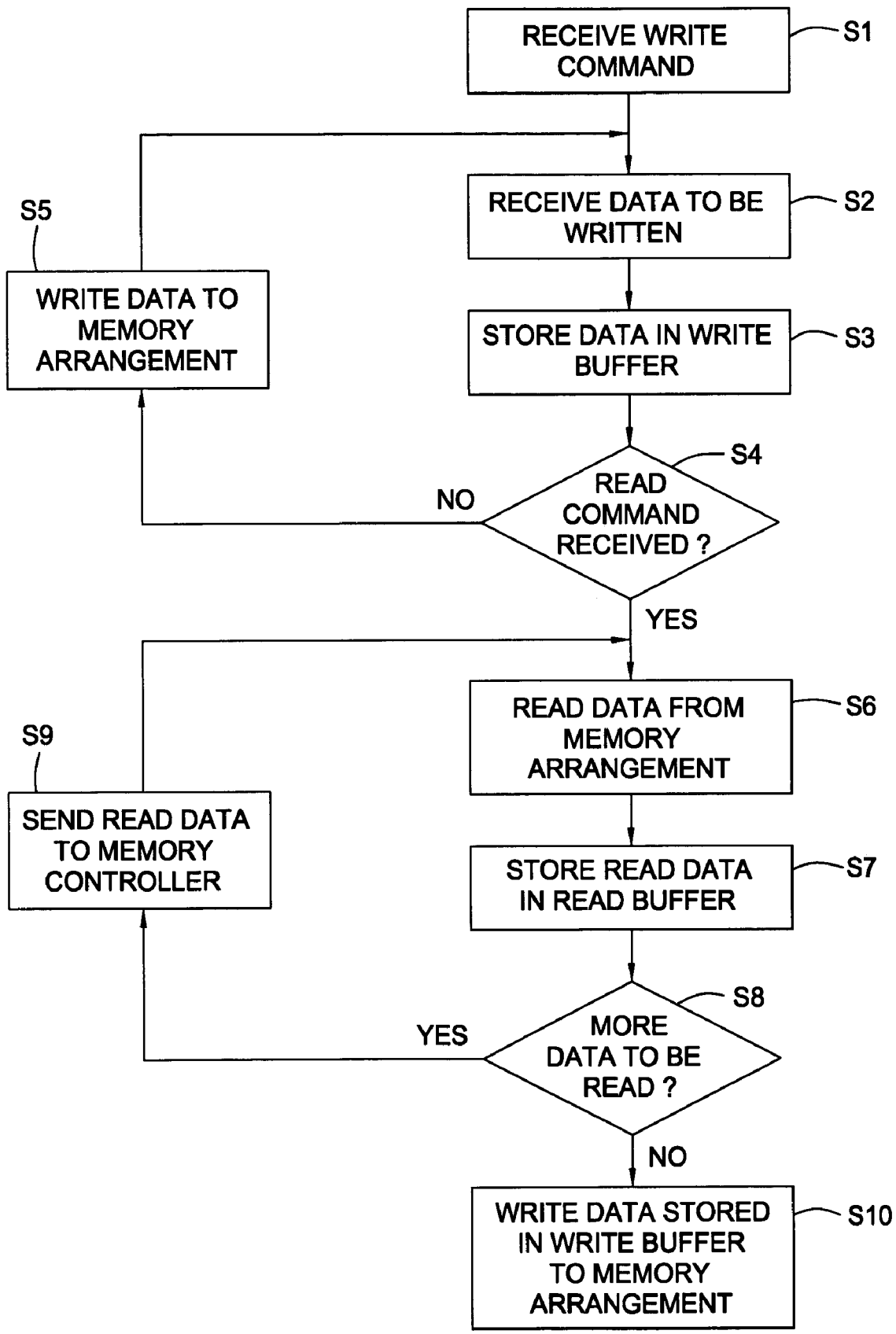
FIG. 2 shows a flowchart to illustrating one embodiment of the inventive method.

FIG. 2 shows a flowchart to illustrating a method 200 according to one embodiment of the invention. The method 200 relates to the sequence in a buffer chip according to one embodiment of the invention. In a step S1, a write command is received by the buffer chip 1, specifying that data which are to be written can now be received via the data bus. The data which are to be written are received in a step S2 and are first buffer-stored in a step S3. In a step S4, a check is then carried out to determine whether a read command for reading the same memory arrangement has been received. If no read command has been received, the buffer-stored data item is written to the addressed memory arrangement in question in a step S5, and execution returns to step S2.

If a read command for the same memory arrangement has been received, then in a step S6 the addressed memory area in the memory arrangement in question is addressed, and the corresponding read data are received. The buffer-stored data to be written are not yet written. The read data received from the addressed memory arrangement are buffer-stored in a step S7, and a check is then carried out in a step S8 to determine whether further data need to be read from the addressed memory arrangement. If further read data from the memory arrangement have been requested, the buffer-stored read data are sent to the memory controller in a step S9, and execution returns to step S6. If no further read data need to be read, then the read data (buffer-stored) are output to the memory controller, and the data to be written which were buffer-stored and have not yet been written to the memory arrangement in question, are written to the memory arrangement (step S10).

The buffer storage 9 described above and the associated control unit 12 may also be provided in more complex form. Thus, by way of example, a read/write cache functionality can be implemented in the buffer chip 1, which not only allows the problems described above to be solved but additionally allows the overall performance of the entire system to be increased. Since, in contrast to the memory chips in the memory arrangement 3, the buffer chip 1 may use a production technology which allows fast logic circuits, and complex cache control circuits may be conceivable in the buffer chip 1. Such a complex cache control circuit is able, for example on the basis of the read and write commands and the address ranges used in the system, to request various memory data which are to be read from the memory chips in the memory arrangement 3 in advance in order to provide the requested data from the buffer storage 9 very quickly in the event of a read command from the memory controller 4.

When such a cache memory is implemented in the form of a buffer storage 9, a fundamental feature is that the execution time for various read or write commands can vary greatly depending on whether the data are handled via the buffer storage 9 or via the cache memory in the buffer chips 1, or whether the read or write commands need to be executed by the memory chips. It is therefore possible to provide a command and user data protocol which allows the data for the individual read and write commands to be transferred in a different order than is prescribed by the commands. To this end, an "identification number" (request ID) may be transferred with the command data item and with the memory data item and may be used to identify associated command data and memory data.

FIG. 3 shows a command protocol 300 for actuating a buffer chip according to one embodiment of the invention. The data lines CA (0 to 7) in the data bus 6 transfer a command data item in four sections, i.e., the "ticks". In a first tick, the memory arrangement address R(0) to R(3) is transferred on the four data bus lines CA0 to CA3. On the other four data bus lines, the identification number RID(0) to RID(3) is transferred in order to be able to associate the command data item with a corresponding memory data item. The remaining ticks are used to transfer address data for the memory chips in the memory arrangements, the bank address and also the actuation commands, row activation signal RAS, column activation signal CAS, write signal WE. On one of the data lines, the second tick is used to transfer a bit which indicates whether the command data item is intended to address a memory chip or memory arrangement, or whether the command data item is a command for the buffer chip 1.

As an alternative, FIG. 4 shows another command protocol 400 for a buffer chip according to another embodiment of the invention. In this case, a further data bus line CA(8) is provided in order to transfer 4 bits of the identification number RID(0 to 3) in the four ticks.

FIG. 5 shows a data protocol 500 for a buffer chip according to one embodiment of the invention. The memory data item is transferred in four ticks having a width of 16 data bits DQ0 to DQ15. The first four data bits in the first tick carry the identification number RID(0 to 3).

FIG. 6 shows another data protocol 600 for a buffer chip according to another embodiment of the invention, where the data bus 6 comprises a further data bus line DQ(16). On the further data bus line DQ(16), four ticks are used to transfer the 4 bits of the identification number, so that it is possible to make an association with the respective command data item having the same identification number.

The provision of identification numbers allows the data for the individual write commands and read commands to be transferred in a different order from and to the memory controller 4 than the command data.

In the example shown in FIG. 1, the buffer storage 9 is arranged between the conversion unit 8 and the second data interface 5. Alternatively, without significantly restricting the functionality, the buffer storage 9 may be arranged between the conversion unit 8 and the switching device 7 or between the first data interface 2 and the switching device 7.

The buffer chip 1 and the connected memory arrangement 3 may be combined in "memory modules" and may be physically integrated in a "DIMM module". DIMM modules are typically memory configurations used in personal computers.

While the foregoing is directed to embodiments of the present invention, other and further embodiments of the invention may be devised without departing from the basic scope thereof, and the scope thereof is determined by the claims that follow.

What is claimed is:

1. A buffer chip for operating with a memory arrangement, comprising:
 a first data interface for receiving, via a data bus, a first data item and a write command for writing the first data item to the memory arrangement, and for sending a second data item which is read from the memory arrangement;
 a conversion unit for parallelizing the received first data item and for serializing the second data item;
 a write buffer for storing the parallelized first data item;
 a second data interface for writing the parallelized first data item from the write buffer to the memory arrangement via a memory data bus in the course of performing the write command, and for receiving the second data item read from the memory arrangement via the memory data bus; and
 a control unit configured to, upon receiving a subsequent read command after performance of the write command has been initiated but prior to completion of the write command, suspend completion of the write command by interrupting the parallelized first data item from being written from the write buffer via the second data interface, wherein a portion of the parallelized first data item has been written to the memory arrangement while a remainder of the parallelized first data item is stored in the write buffer, in order to read the second data item from the memory arrangement into the buffer chip via the second data interface.

2. The buffer chip of claim 1, wherein the control unit is configured to write the remainder of the parallelized first data item stored in the write buffer to the memory arrangement when the second data item has been read from the memory arrangement.

3. The buffer chip of claim 1, wherein the control unit is configured to output the second data item via the first data interface upon receiving a read command.

4. The buffer chip of claim 1, wherein the write buffer is configured to store a plurality of parallelized data items.

5. The buffer chip of claim 1, further comprising:
 a read buffer for storing the second data item, wherein the control unit is configured to send the second data item from the read buffer in one or more portions.

6. The buffer chip of claim 5, wherein the read buffer is configured to store a plurality of second data items and wherein the control unit preloads the second data items into the read buffer according to a cache function.

7. The buffer chip of claim 6, wherein the control unit is configured to buffer a plurality of read commands and to send one or more requested data items which are stored in the read buffer or in the write buffer before sending one or more requested data items stored in the memory arrangement.

8. A method for operating a buffer chip connected to a memory arrangement, comprising:
 utilizing a first data interface to receive, via a data bus, a first data item and a write command for writing the first data item to the memory arrangement;
 utilizing a conversion unit to parallelize the received first data item and to serialize a second data item which is read from the memory arrangement;
 utilizing the first data interface to send the serialized second data item;
 utilizing a write buffer to store the parallelized first data item;
 utilizing a second data interface to write the parallelized first data item from the write buffer to the memory arrangement via a memory data bus in the course of performing the write command, and to receive the second data item read from the memory arrangement via the memory data bus; and
 controlling operations of the buffer chip utilizing a control unit, wherein the control unit is configured to upon receiving a subsequent read command after performance of the write command has been initiated but prior to completion of the first write command, suspend completion of the write command by interrupting the parallelized first data item from being written from the write buffer via the second data interface, wherein a portion of the parallelized first data item has been written to the memory arrangement while a remainder of the parallelized first data item is stored in the write buffer, in order to read the second data item from the memory arrangement into the buffer chip via the second data interface.

9. The method of claim 8, wherein the control unit is further configured to write the remainder of the parallelized first data item stored in the write buffer to the memory arrangement when the second data item has been read from the memory arrangement.

10. The method of claim 8, wherein the control unit is further configured to output the second data item via the first data interface upon receiving a read command.

11. The method of claim 8, wherein the write buffer is configured to store a plurality of parallelized data items.

12. The method of claim 8, further comprising:
 utilizing a read buffer to store the second data item, wherein the control unit is further configured to send the stored second data item in one or more portions.

13. The method of claim 12, wherein the read buffer is configured to store a plurality of second data items and wherein the control unit preloads second the data items into the read buffer according to a cache function.

14. The method of claim 13, where the control unit is further configured to buffer a plurality of read commands and to send one or more requested data items which are stored in the read buffer or in the write buffer before sending one or more requested data items stored in the memory arrangement.

15. The method of claim 8, wherein the control unit is further configured to write the remainder of the parallelized first data item stored in the write buffer to the memory arrangement upon receiving a second write command subsequent to completion of the subsequent read command.

16. The method of claim 8, wherein the control unit is further configured to write the remainder of the parallelized first data item to the memory arrangement if the subsequent read command is followed by a second write command.

17. The method of claim 8, wherein the control unit is further configured to write the remainder of the parallelized first data item to the memory arrangement if no further read or write command follows the first write command and the subsequent read command during a pause in access to the memory arrangement subsequent to the completion of the subsequent read command.

18. A system, comprising the buffer chip of claim 1 and a plurality of electrical components, the plurality of electrical components being at least one of structurally related to the buffer chip.

19. The system of claim 18, wherein an electrical component of the plurality of electrical components is the memory arrangement.

20. A system, comprising the buffer chip of claim 1 and a plurality of electrical components, the plurality of electrical components being at least structurally functionally related to the buffer chip.

* * * * *